(12) United States Patent
Van Lijssel et al.

(10) Patent No.: US 12,193,451 B2
(45) Date of Patent: Jan. 14, 2025

(54) SEPARATING AN INTESTINE FROM A BOWEL PACKAGE

(71) Applicant: CTH B.V., Almere (NL)

(72) Inventors: Johannes Wilhelmus Nicolaas Van Lijssel, Almere (NL); Jeroen René Maria Colpaert, Almere (NL); Johannes Frederik Hansen, Almere (NL); Michal Grzyb, Almere (NL); Sander Hendrik Lucien Hochstenbach, Almere (NL); Rob Den Besten, Almere (NL); Cederic Cecilius Hendrikus Johannes Maria Rutting, Almere (NL)

(73) Assignee: CTH B.V., Almere (NL)

( * ) Notice: Subject to any disclaimer, the term of this patent is extended or adjusted under 35 U.S.C. 154(b) by 0 days.

(21) Appl. No.: 18/274,815

(22) PCT Filed: Feb. 15, 2022

(86) PCT No.: PCT/NL2022/050077
§ 371 (c)(1),
(2) Date: Jul. 28, 2023

(87) PCT Pub. No.: WO2022/177424
PCT Pub. Date: Aug. 25, 2022

(65) Prior Publication Data
US 2024/0306654 A1    Sep. 19, 2024

(30) Foreign Application Priority Data

Feb. 16, 2021 (NL) .................................. 2027565
Feb. 16, 2021 (NL) .................................. 2027566

(51) Int. Cl.
*A22C 17/00*      (2006.01)
*A22C 17/14*      (2006.01)

(52) U.S. Cl.
CPC .................................. *A22C 17/14* (2013.01)

(58) Field of Classification Search
CPC .............................. A22C 17/00; A22C 17/14
(Continued)

(56) References Cited

U.S. PATENT DOCUMENTS 3,882,571 A   5/1975   Evers et al.
3,949,447 A   4/1976   Evers et al.
(Continued)

FOREIGN PATENT DOCUMENTS

EP    2816902 B1    4/2016
SE     508501 C2   10/1998
WO  2020/002208 A1  1/2020

OTHER PUBLICATIONS

International Search Report issued in International Application No. PCT/NL2022/050077, dtd Jun. 28, 2022.

*Primary Examiner* — Richard T Price, Jr.
(74) *Attorney, Agent, or Firm* — Occhiuti & Rohlicek LLP

(57) ABSTRACT

The invention provides a system (1) for separating an intestine (10) from a bowel package (19) comprising a package remainder (17) and a membrane (11) connecting the intestine (10) to the package remainder (17); the system (1) comprising (i) a retaining zone (2) comprising a retaining location (21), (ii) a separation zone (3), (iii) a sensing zone (5), (iv) a collecting zone (8), (v) a retaining element (20), (vi) a transporting element (41), (vii) a sensor (51), and (viii) a control system (6); wherein (i) the retaining element (20) is configured for holding at least a part of the package remainder (17) at the retaining location (21); (ii) the transporting element (41) is configured for engaging with a first intestine end (13) separated from the membrane (11) and for moving the intestine (10) in a direction from the retaining zone (2) to the collecting zone (8), wherein the intestine (10)

(Continued)

is moved through the separation zone (3) via the sensing zone (5); (iii) the sensor (51) is configured for sensing a parameter of the intestine (10), relating to a connection location (15) connecting the intestine (10) to the membrane (11); (iv) the control system (6) is configured for controlling positioning of a mobile separation device (31), during moving the intestine (10) such that the mobile separation device (31) separates the intestine (10) in the separation zone (3) from the membrane (11) at a predetermined longitudinal intestine position (12) based on the connection location (15) determined from the parameter sensed in the sensing zone (5) at the predetermined longitudinal intestine position (12).

18 Claims, 5 Drawing Sheets

(58) Field of Classification Search
USPC .......................................................... 452/106
See application file for complete search history.

(56) References Cited

U.S. PATENT DOCUMENTS

| | | | |
|---|---|---|---|
| 4,063,331 A | | 12/1977 | O'Neal et al. |
| 4,538,325 A | * | 9/1985 | Harben, Jr. ............ A22C 21/06 |
| | | | 452/114 |
| 5,569,067 A | * | 10/1996 | Meyn ........................ A22B 5/18 |
| | | | 452/106 |
| 11,819,035 B2 | * | 11/2023 | Roos ....................... A22C 17/14 |

\* cited by examiner

SEPARATING AN INTESTINE FROM A BOWEL PACKAGE

CROSS REFERENCE TO RELATED APPLICATIONS

This application is the national phase under 35 USC 371 of International application no. PCT/NL2022/050077, filed Feb. 15, 2022, which claims the benefit of the filing date of Netherlands Application No. 2027565 filed on Feb. 16, 2021, and Netherlands Application No. 2027566 filed on Feb. 16, 2021, the contents of all of which are hereby incorporated by reference in their entireties.

FIELD OF THE INVENTION

The invention relates to a system and a method for separating a small intestine from a bowel package.

BACKGROUND OF THE INVENTION

System and methods for separating an intestine from a bowel package are known. EP2816902, for instance describes a device for separating an intestine subjected to a pulling force from a structure such as a fatty structure connected to the intestine by means of cutting, wherein the device comprises a guide for guiding at least the intestine; and a cutting member connected to the guide for severing the structure in the vicinity of the intestine, and wherein the cutting member is adapted to sever the structure as closely as possible to the intestine. The document also describes to such a method, comprising of fixing the structure, exerting a pulling force on the intestine, guiding the intestine and severing the structure in the vicinity of the intestine, wherein the combination of the structure and the intestine is guided prior to the cutting.

U.S. Pat. No. 3,882,571 describes an apparatus for separating the small intestine of a beast, such as a steer, from the stomach of the beast. The apparatus incorporates an orientation horn which has a longitudinal body and a curved leading end. An initial manual severing of the small intestine tube from the stomach is effected wherein the mesentery web holding the small tube to the stomach is severed as is a small portion of fatty tissue between the intestine tube and the outer wall of the stomach. The small piece of intestine tube so isolated from the stomach is fed on to the leading end of the orientation horn which is rounded to accept the intestine tube thereover. A cutter such as a rotary blade is positioned adjacent the horn so that as the small intestine tube is fed along the horn the cutter effect a severing of the mesentery web holding the small intestine tube to the stomach and also of the fatty tissue aforesaid.

SUMMARY OF THE INVENTION

Sausage casing, also known as sausage skin or simply as casing, is the material used for enclosing the filling of a sausage. Natural casings are products of animal origin. The intestines often come from hogs (pigs), but also the intestines of sheep, goats, cattle and sometimes horses are used. Natural casings are normally made from the sub-mucosa of the small intestine, i.e. a layer of the intestine that consists mainly of naturally occurring collagen (after removing the intestine content—manure—and cleaning the intestine). The size and usage of natural casings are impacted by the animal they are derived from. The size for lamb casings may, e.g. range from 14 mm to 28 mm in diameter, whereas the size for hog casings may range from 28 mm to about 58 mm in diameter.

When an animal is slaughtered, the animal is normally opened, and the bowel package is taken out of the abdominal cavity. At this stage, the bowel package comprises organs like the bowel, liver, kidneys, stomach, etc. The bowel package is normally at least partly filled with a digestive tract content. The bowel e.g. may still comprise manure. The different organs may successively be removed from the bowel package. Whether and when one or more of these organs are removed may depend on the further processing of the package. Normally, also aggregates of the bowel and one or more of the other parts of the package may be referred to as bowel package (or pack), also if already one or more of the organs are removed. At least the small intestine (or small bowel) is attached to the bowel package. The bowel package especially comprises the large intestine (or large bowel). The small intestine is normally connected to the large intestine and to the stomach. The bowel package may further at least comprise some further structures/membranes connecting the small intestine to elements of the package such as to the large intestine and/or to other elements that were present in the abdominal cavity.

It is rather general that different components of the bowel package are separated manually from each other. During processing care must be taken not to puncture any one of the organs or e.g. open the bowel wall to prevent faeces or other digestive tract content from contaminating the working area and edible parts of the bowel package. Therefore, it appears to be desirable to at least partly automating the process of separating the (small) intestine from the (remainder) of the bowel package.

It is noted that in general it may be indicated that the (small) intestine is separated from the bowel package. This may indicate that the intestine is an element of the bowel package. It may also indicate that the intestine and the bowel package are two different elements that form an assembly in the abdominal cavity. Herein, especially, for clarity reasons the term "bowel package" may not include "the (small) intestine". Using this definition, also after separating the (small) intestine from the bowel package, at least two identifiable elements remain, i.e. the intestine and the bowel package. Before separation, the two elements may form an aggregate of intestine and bowel package. The term "bowel package" especially refers to a membrane and remainder of the bowel package, and especially the membrane may connect the intestine to the remainder of the bowel package (in the abdominal cavity).

Hence, it is an aspect of the invention to provide an alternative method for separating an intestine (a small intestine) from the bowel package, which preferably further at least partly obviate(s) one or more of above-described drawbacks. It is a further aspect of the invention to provide an alternative system for separating an intestine (a small intestine) from the bowel package, which preferably further at least obviate(s) one or more of above-described drawbacks. The present invention may have as object to overcome or ameliorate at least one of the disadvantages of the prior art, or to provide a useful alternative.

In a first aspect, the invention provides a system, in specific embodiments for separating an intestine (especially a small intestine, even more especially an at least partly filled small intestine) from a bowel package ("system"). Especially, the bowel package comprises a package remainder and a membrane connecting the intestine to the package remainder. The system may in embodiments comprise a retaining zone, a separation zone, a sensing zone and a collecting zone. The retaining zone may comprise a retaining location. In further embodiments, the system comprises a sensor. In specific embodiments, the system further comprises a control system or is functionally coupled to a control system. The system may further comprise a transporting element. The system may further comprise a retaining element. The retaining element is especially (configured) for holding (keeping) at least a part of the package remainder, especially at the retaining location. Further, especially, a second intestine end (a second end of the intestine, especially comprising a second extreme of the intestine) is attached to the package remainder. In specific embodiments, the transporting element is configured for engaging with a first intestine end (a first end of the intestine, especially comprising a first extreme of the intestine), especially a first intestine end separated from the membrane. The transporting element may further be configured for moving the intestine in a direction from the retaining zone to the collecting zone, especially wherein (at least part of) the intestine (especially comprising the second intestine end) is moved through the separation zone via the sensing zone. During operation (wherein the intestine is moved), the retaining zone is thus especially configured upstream of the sensing zone, and the sensing zone is configured upstream of the separation zone (with respect to a direction of propagation of the intestine. The separation zone is especially configured upstream of the collecting zone during operation. The sensor may in embodiments especially be configured for sensing, in the sensor zone, a parameter of the intestine relating to a connection location connecting the intestine to the membrane (or 'a connection location between a membrane of the bowel package and the intestine'). In embodiments, the control system is especially (at least) configured for controlling positioning of a mobile separation device ("separation device"), especially during moving the intestine. In specific embodiments, the control system is configured for positioning of the separation device such that the mobile separation device separates the intestine in the separation zone from bowel package, especially from the membrane, at a (predetermined) longitudinal intestine position (a longitudinal position of the intestine) based on the connection location determined from the parameter sensed in the sensing zone at the (predetermined) longitudinal intestine position. The system especially comprises a (mobile) separation device, especially mobile in a (predetermined) space, especially along a path. The transporting element is especially configured for moving the intestine wherein the intestine traverses (crosses) the path or the determined space at a location downstream of the sensor zone. In specific embodiments, the system is further configured for straightening (at least a part of) the membrane (both) in the sensing zone and in the separation zone. The membrane (that may be straightened) in sensing zone may be arranged at a sensing area (configured for) being sensed by the sensor. The membrane (that may be straightened) in the separation zone may comprise a separation location at which the intestine is concurrently (arranged for) being separated from membrane (by the separation device) (during operation). Further, especially straightening may at least partly be based on gravity. In embodiments, the separation device comprises a cutting device selected from the group consisting of a static blade cutter, a rotating blade cutter, an oscillating blade cutter, and a cutting wire. In further specific embodiments the (mobile) separation device comprises a rotating blade cutter.

In a further aspect, the invention provides a method for separating an intestine (especially a small intestine, more especially an at least partly filled small intestine) from a bowel package ("method"). Further, especially the method comprises a preparation stage, an arranging stage and a separation stage. In embodiments, the preparation stage comprises manually separating a first intestine end from the bowel package, especially from a membrane of the bowel package (wherein a second intestine end is attached to the bowel package). Further, in embodiments, the arranging stage comprises providing the first end of the intestine to a transporting element. The arranging stage further especially comprises providing at least part of a package remainder of the bowel package, especially comprising the second intestine end, to a retaining element (arranged) in a retaining zone. The retaining element is especially configured for holding the at least part of the package remainder. Especially, the arranging stage may (thus) further comprise: holding at least part of the package remainder of the bowel package (, wherein the at least part of the package remainder) comprising a second intestine end, at a retaining element in a retaining zone. Further, in embodiments, the separation stage comprises moving the intestine in a direction from the retaining zone to a collecting zone, especially wherein the intestine is moved through a separation zone via a sensing zone. Moving the intestine in a direction from the retaining zone to the collecting zone is especially done while straightening (at least partly based on gravity) (at least part of) the membrane (both) in the sensing zone and in the separation zone. Straightening may (at least partly) be based on moving the intestine. In further embodiments, the separation stage especially comprises (while moving the intestine): sensing a parameter of the intestine (arranged) in (or moving through) the sensing zone (as a function of a longitudinal intestine position, wherein the parameter relates to a connection location connecting the intestine to the membrane, and especially determining the connection location (as a function of the longitudinal intestine position) based on the sensed parameter (as the function of the longitudinal intestine position). Further, especially, the separation stage comprises (while moving the intestine): (continuously) separating the intestine from the membrane with a mobile separation device by controlling 15 positioning of the mobile separation device such that the separation device separates the intestine in the separation zone from the bowel package, especially from the membrane at a (predetermined) longitudinal intestine position based on the connection location determined from the parameter sensed in the sensing zone at the (predetermined) longitudinal intestine position. The method especially comprises, especially during moving the intestine: (continuously) separating the intestine from the bowel package with the (mobile) separation device (especially at a separation location located at the membrane) by moving the (mobile) separation device in a space and/or along a path at a location downstream of (a location sensed by) the sensor. The (mobile) separation device is in specific embodiments, moved to a separation location as a function of a longitudinal intestine position. In embodiments, the (mobile) separation device comprises a rotating blade cutter (or "rotating blade cutter device"). In further embodiments, the (mobile) separation device comprises a waterjet cutting device.

With such system and/or method, the (small) intestine may be separated from the bowel package at a controlled way. The resulting intestine may be of a consistent high quality. Possible punctures of the intestine may be prevented or at least be reduced. Further remains of the membrane at the intestine may be reduced. The system may be based on fast and a non-complex method to detect a connection or junction of the intestine with the membrane especially using a vision system. The vision system may in embodiments detect a "shadow" of the intestine (especially at least partly filled with manure and further comprising a mucous tissue layer surrounding the manure) using a radiation (light) source radiating the intestine from the back. The method may be fast based on a more or less binary evaluation of the transition of a (rather transparent) membrane to a (filled and much less transparent) intestine. The method may be based on a dichromatic evaluation of the intestine and the membrane. The method (and used system) may in embodiment further at least partly autonomously straighten the membrane to be separate based on gravity. Further, by moving the intestine, the intestine connected to the bowel package may be directed to the separation device, wherein the membrane is further straightened. No further guiding system may be required for guiding the combination of the intestine and the bowel package along the separation device or flattening the membrane in the separation zone (to facilitate a correct separation).

Hence, in specific embodiments, the invention provides a system, especially for separating an intestine from a bowel package, especially wherein the bowel package comprises a package remainder and a membrane connecting the intestine to the package remainder, wherein the system comprises: a retaining zone, a separation zone, a sensing zone, a collecting zone, a retaining element, a transporting element, a sensor, and a control system; wherein (i) the retaining zone comprises a retaining element configured for holding at least a part of the package remainder at a retaining location, especially wherein a second intestine end is attached to the package remainder; (ii) the transporting element is configured for engaging with a first intestine end separated from the membrane and for moving the intestine in a direction from the retaining zone to the collecting zone, wherein (at least part of) the intestine (comprising the second intestine end) is moved through the separation zone via the sensing zone; especially wherein the system is configured for straightening (at least partly based on gravity) (at least part) of the membrane (both) in the sensing zone and in the separation zone; (iii) the sensor is configured for sensing in the sensing zone a parameter of the intestine (the parameter) relating to a connection location connecting the intestine to the membrane; (iv) the control system is configured for controlling positioning of a mobile separation device such that the mobile separation device separates the intestine in the separation zone from the membrane at a (predetermined) longitudinal intestine position based on the connection location determined from the parameter sensed in the sensing zone at the (predetermined) longitudinal intestine position. The separation device may in embodiments be selected from the group consisting of a beam cutting device, such as a waterjet cutting device and a laser cutting device, and a blade cutting device (or blade cutter), such as a static blade cutter, a rotating blade cutter, an oscillating blade cutter, and a cutting wire.

In embodiments, the invention provides the method for separating an intestine from a bowel package, wherein the system of the invention is used. In specific embodiments, the method comprises providing the system described herein. In specific embodiments, elements used in the method correspond to elements described in relation to the system of the invention (and vice versa).

The method and the system described herein especially relate to separation of the small intestine from the bowel package. As described above, herein, a combination of one or more of the organs of the gastrointestinal (GI) tract, especially at least comprising the large intestine, in combination with the membrane structure, may be referred to as "bowel package". Further, the small intestine separated from the bowel package as well as the small intestine attached to the bowel package may be referred to herein as the "intestine". Based on the context it will be understood whether the (small) intestine is still attached to the bowel package (at a predetermined longitudinal intestine position) or that the (small) intestine has been separated from the bowel package. Moreover the term "separated" and comparable terms such as in the phrase "the first end of the intestine being separated from the bowel package" may especially refer to a local location, especially related to the longitudinal intestine location (see further below). The terms "bowel package" and "intestine" further especially relate to a bowel package or an intestine, respectively that is (at least partly) filled with a digestive tract content. Other commonly used terms to refer to the bowel package are "bowel pack", "intestinal package", "intestinal pack".

Further, the term "intestine" used herein especially refers to the small intestine. The small intestine is essentially a long narrow folded or coiled (hollow) tube. The small intestine comprises a (central) axis of elongation, or (central) "longitudinal intestine axis" or "intestine axis". The (longitudinal) intestine axis may (also) be curved and/or coiled. A direction of the (longitudinal) intestine axis may change along a length of the intestine or e.g. when moving the intestine. Yet locally (and/or in time-spatiotemporally) the direction of the (longitudinal) intestine axis may be determined. The small intestine essentially comprises a small intestine wall surrounding a small intestine content, comprising e.g. manure. The small intestine wall essentially comprises a plurality of tissue layers, referred to as "mucosa", submucosa," "muscularis", and "serosa". The small intestine extends from the stomach to the large intestine. The small intestine may comprise three parts: duodenum, jejunum, and ileum. When referring to the small intestine, herein the terms "intestine", "(small) intestine", "small intestine", "small bowel" and comparable terms may be used interchangeably. The small intestine is especially at least partly filled (with the intestine content). When referring to the large intestine, herein especially the term "large intestine" or "large bowel" is used.

Further, herein the term "intestine" especially relates to an intestine of a (domestic) animal, such as a sheep, a lamb, a hog (pig), a cow, cattle, or e.g. a horse. The system and the method may especially be configured for separating one or more of these types of intestine from the respective bowel package. In embodiments, the system and method are configured for separating hog (or pig) intestines. In further embodiments, the system and method may be configured for separating intestines of a plurality of (different) animals. The differences between the intestines of different animals may especially be found in a total length of the intestine and a size of the intestine, especially a diameter or caliber of the intestine. Yet the basis for separating the intestine from the bowel package may be similar.

In embodiments the term "separating" and related terms may relate to cutting, slicing, severing, dividing, and e.g. removing (the intestine from (the remainder of) the bowel package). A membrane structure comprising fat, tissue, arteries, nerves, etc. normally connects the small intestine to the large intestine. The membrane may suspend the small and large intestine from the posterior abdominal wall. In the abdominal cavity, the membrane especially may anchor the small and the large intestine in place, whilst still allowing some movement. This structure may also be known as "mesentery". Furthermore, the term "membrane" such as in the phrases, "the membrane of the bowel package" and "the membrane connected to the intestine" especially relates to the membrane structure described above. It is noted that although during separation still a connection between the intestine and the bowel package may exist, e.g., at a location upstream of the separation device, herein it may be indicated that at least a part (especially along a length of the intestine) of the intestine is separated from the bowel package. When it is described that the intestine is separated from the bowel package at a specific location this may especially indicate that at that location (especially a longitudinal intestine location) the intestine and the membrane are separated from each other (yet, small parts of the membrane may still be present, see below).

The membrane especially has a shape corresponding to (in agreement with) a shape of the intestine. The membrane may comprise curves and may have an irregular shape. Separating the intestine from the bowel package manually at a location of the membrane and close to the intestine may require the skills of a craftsman. Because of the irregularities and changes in the shape of the membrane and intestine, essentially a position of a separation device may continuously have to be adapted to the changing shapes (when moving the intestine (connected to the membrane) along the separation device.

The system and the method of the invention are in embodiments based on the following: During separating, the bowel package may be maintained at a specific location. A (pulling) force may be applied on a part of the intestine that is (already) separated from the bowel package, to move the intestine (the part already separated and a further part of the intestine still connected to the membrane) in a first direction. While moving the intestine, the intestine may be separated from (the membrane of) the bowel package by positioning a separation device, in or against (e.g. such a blade of a knife) or impinging on (e.g. a waterjet) the membrane close to (a wall of) the intestine. Because of the shape of the intestine and the membrane, the separation device may (continuously) be moved to keep separating the intestine at a location close to (the wall of) the intestine (when the intestine is moved along the separation device). The separation device may be moved in a direction at an angle of, e.g. perpendicular to, the (longitudinal) intestine axis at the separation location to keep separating the intestine at the location close to (the wall) of the intestine (for each longitudinal intestine location). The separation device may be positioned as a function of a longitudinal intestine position. The separation device may e.g. be moved along the track to position the separation device. If the separation device would not be moved, the knife or e.g. the jet might puncture the intestine at some (longitudinal intestine) locations. At other locations separation might then be performed far remote of the intestine (and much of the membrane would remain at the intestine). The location to position the separation device (for a given longitudinal intestine position) may be controlled based on a determination of a location where the membrane connects to (or joins with) the intestine (herein also referred to as "a connection location") (for the given longitudinal intestine position). The separation device may be positioned to leave only a minimized amount of membrane at the intestine (while not damaging the intestine). The connection location may be determined upstream (of a location being separated, especially) of the separation zone, more especially at a location upstream of the path or predetermined space. Hence, in embodiments, the intestine is moved in a first direction, and the separation device is moved in a second direction. The second direction may in embodiments be substantially perpendicular to the first direction or at an angle with the first direction, especially at the separation location. The second direction is especially not parallel (in opposite direction) to the first direction or parallel to the (longitudinal) intestine axis (at the separation location). The separation device may reciprocate according to the path (e.g. going up and down). The second direction may (therefore) alternate. The second direction may change during operation. The second direction may in a first period be in a determined (3-dimensional) direction and in a further period in another (3-dimensional) direction, for instance opposite to the determined direction. The path may be perpendicular to the first direction (or to the intestine axis at the separation location). In other embodiments the path may be under an angle with the first direction (or the intestine axis at the separation location). The path is not necessarily a straight path. Therefore it may also be indicated that that the separation device may be mobile in a predetermined space. The path may in embodiments, e.g., be curved or have any arbitrary form. The separation device may e.g. in embodiments comprise, or be functionally coupled to, a robotic arm defining (or controlling) the form of the path. In embodiments, the (longitudinal) intestine axis at the separation location is substantially parallel to the first direction.

Hence, in embodiments, the membrane is cut and/or divided and/or severed in the vicinity of the intestine. Moreover, the system, especially the separation device is configured to cut and/or divide and/or severe the membrane at a minimized distance from the intestine.

The separation device may basically comprise any device able to divide (cut) the membrane, especially when the intestine connected to the membrane is moved along, towards, or against, (a cutting member of) the separation device. In embodiments, (the cutting member of) the separation device may contact the membrane to separate the intestine, especially to cut the membrane. The separation device may e.g. comprise a knife or a wire or a cable. In embodiments, the separation device comprises a static blade cutter (or "static blade knife" or "static knife") or a reciprocating blade cutter (or "reciprocating knife"). In further embodiments, the separation device comprises an oscillating blade cutter (oscillating blade knife). In yet further embodiments, the separation device comprises a rotating blade cutter (or "rotating blade knife" or "rotating knife"). The rotating knife may have the advantage that the knife may be used for a prolonged time (compared to e.g. a static knife) while maintaining sharp. Moreover, even when temporarily not rotating, the rotating knife may still cut. The rotating knife may further in embodiments be sharpened while rotating. Likewise, the reciprocating knife may be sharpened during reciprocating. The system may in embodiments comprise a sharpening element (configured for sharpening the separation device). The sharpening element may e.g. contact the (blade of) the separation device. Further, in embodiments a blade (such as the static blade, rotating blade, or oscillating blade) of the separation device may be configured substantially parallel to the longitudinal intestine axis at the separation location. In other embodiments, (a plane of) the blade may be arranged at an angle relative to the intestine axis at the separation location, such as angle selected from the range of 0-90°, such as 5-80°, especially 10-60°, even more especially 25-65°. Yet, in further embodiments, said angle is especially in the range of 45-90°, such as 60-90°, even more especially in the range of 75-90°, such as 80-90°. Especially, having the blade of a rotating blade cutter configured (almost) perpendicular to the intestine axis (at the separation location) experimentally showed good results for separation of the intestine from the bowel package (especially in minimizing the amount of membrane left at the intestine). Hence, in embodiments, the separation device comprises a cutting device selected from the group consisting of a static blade cutter, a reciprocating blade cutter, a rotating blade cutter, an oscillating blade cutter, and a cutting wire. The separation device especially comprises a rotating blade cutter. In further embodiments, a longitudinal intestine axis and (a plane of) a blade of the separation device, especially the rotating blade cutter, define an angle $\alpha$ selected in the range of 0-90°, such as in the range of 60-90°, such as in the range of 80-90°, especially substantially 90° (especially equal to or less than 90°).

In further embodiments, the separation device comprises a waterjet cutting device (or "waterjet cutter"). The waterjet cutter may e.g. have a nozzle dimension (diameter) equal to or larger than 0.01 mm, such as equal to or larger than 0.05 mm. The nozzle dimension may especially be equal to or smaller than 1 mm, such as 0.5 mm at maximum. In embodiments the nozzle dimension is in the range of 0.01-0.5 mm, especially 0.05-0.3 mm, such as 0.1-3 mm, especially about 0.1 mm. In embodiments, the waterjet cutter is configured to operate at a pressure of at least 500 bar, such as at least 750 bar. The operating pressure may especially be 10,000, such as 6000, especially 4000 at maximum. In embodiments the operating pressure is in the range of 800-4000 bar, especially 800-2000 bar, such as 800-1500 bar, especially about 1000 bar. The (nozzle of the) waterjet cutter may especially be arranged at a distance of 0-50 mm from the separation location, such as at a distance of 10-40 mm, especially at a distance of 10-20 mm, such as at a distance of about 15 mm. The waterjet cutter may in embodiments utilize (apply) tap water (as the cutting medium). In further embodiments the waterjet cutter may utilize softened and/or de-ironed water, salted water or ice water. Especially a temperature of the water of the jet is about 20° C. However in embodiments the temperature of the water of the jet is in the range of 0-60° C. The separation device may further comprise a laser cutting device (or "laser cutter"). Hence, in embodiments the separation device comprises one or more cutting devices selected from the group consisting of a waterjet cutting device and a laser cutting device. A beam cutting device such as a waterjet cutter and also a laser cutter may have the advantage that physical contact between the device and the membrane is minimized, which may prevent from optional (cross) contamination via the separation device. Such device may improve the hygienic processing. These types of devices may not become blunt. Moreover, a human may not be cut by a beam cutting device when (the device) is turned off (because of the absence of a sharp blade). Further, a laser cutter may leave less waste.

Hence, the separation device, especially a cutting member of the separation device, may directly contact the membrane when separating, such as with a blade or a wire. In further embodiments the separation device may provide an element or beam that impinges on the membrane to separate the intestine from the membrane, such as with a waterjet or a laser beam. The separation device may in embodiments provide the element, beam or cutting member. If the separation device is positioned to (at the path) to separate this may imply that in embodiments, (a part of) the separation device (especially the cutting member) is physically positioned at the separation location (e.g., the blade or the wire). Yet, in other embodiments the separation device may be configured further remote and directed towards the separation location such that the (water or laser) beam impinging on the membrane, impinges at the separation location (and separates the intestine from the membrane). Moreover, the separation device may in these last embodiments be configured for providing the cutting member at the separation location such that the cutting member (e.g. water or laser beam), impinges at the separation location (and separates the intestine from the membrane). Both types of positioning are covered by phrases like "positioning of the separation device such that the separation device separates the intestine from the bowel package (or from the membrane) at the separation location" and "separating the intestine from the membrane with a separation device by moving the separation device along the path". The mobile separation device may especially be selected from the group consisting of a rotating blade cutter and a waterjet cutting device.

As described above, the separation device may be configured mobile along the path (or in the predetermined space). It is noted that the term "static" with respect to the separation device such as in "static knife", "static blade" and the like especially relates to the cutting member of the separation device. Also a static knife may be movable along the path. The term "mobile" especially indicates that the separating device is configured to move the cutting member (such as the blade and the beam) during cutting/separating.

In embodiments, the system may further comprise a guiding system. In further specific embodiments, the separation system, comprises the guiding system. The guiding system may be part of the separation device or may be functionally couple to the separation device. The guiding system may e.g. comprise the robotic arm described above. The guiding system may in further embodiment comprise a linear guiding system. In embodiments, the separation device is coupled to the (linear) guiding system. In further specific embodiments, the separation system comprises a (linear) guiding system defining the track. The linear guiding system (or "linear guide") may allow fast movement of the separation device along the path and precise positioning.

The separation device may in embodiments be mobile over a length (of the path of) at least 20 cm (to handle variations in the location of the connection location), especially at least 30 cm, such as at least 40 cm, or even at least 60, such as at least 75 cm. Hence, the path may have a length selected from the range 0-120 cm, such as of 25-100 cm, especially in the range of 40-100 cm, even more especially in the range of 50-100 cm. The path is especially at least 50 cm. In embodiments, (the length of) the path is 100 cm at maximum.

As described above, the membrane is especially attached to the intestine. The membrane and the intestine may be joined or merged at a predetermined location. Based on (a shape of) the wall of the intestine, a specific location (for each longitudinal location of the intestine) may be indicated that distinguishes the intestine from the membrane. Especially along the entire (length of the) intestine, the specific location may be indicated. Herein, the specific location is referred to as "connection location". Hence, at the connection location the membrane and the intestine may be joined. The connection location may be given for any (predetermined) longitudinal intestine position, and may be described as a function of the longitudinal intestine position. The connection location especially comprises numerous (e.g. more than hundred or more than thousand) connection locations or a (continuous) line of connection locations. For instance a first connection location may be sensed in the sensing zone, whereas close to a second connection location, the intestine may be separated (at the separation location).

Therefore, the connection location may (locally) be related to (a function of) the longitudinal intestine position. Herein, (although the transition between the membrane and the intestine may be gradually) the connection location especially separates the intestine and the membrane.

When separating the intestine from the bowel package, it may be advantageous to separate the intestine from the membrane substantially at the connection location, resulting in an intestine with a minimized amount of membrane connected to the intestine. Yet, to prevent damaging the intestine, it may be desirable to leave a minimal amount of the membrane, and to separate the intestine in the close vicinity of the connection location. It will be understood that in the vicinity in this respect relates to a location at the membrane. Separation is especially done at a location of the membrane and/or through the membrane. In embodiments, the separation location is located at the membrane. The system (and method) is (are) especially configured for separating the intestine (for each longitudinal intestine position) at the separation location. Therefore, the separation location may be determined based on the connection location. Like the connection location, also the separation location may comprise numerous separation location or a (continuous) line of connection locations. It may therefore also be indicated that the first separation location is determined based on the first connection location, the 5th separation location may be based on the 5th connection location, etc. (if the number of separation locations equals the number of connection locations). The separation location is especially also a function of the longitudinal intestine position. The separation location at a predetermined longitudinal intestinal position is especially related to/based on the connection location at the (same) predetermined longitudinal intestinal position.

In embodiment, thus, at least part of the membrane (e.g. in the form of a strip) may (still) be attached to the intestine after separating the intestine from the bowel package. Such strip, or especially (remaining) parts of the strip may especially have a width (perpendicular to the intestine) of 25 mm or less, such as 10 mm or less, especially 5 mm or less, or even 3 mm or less. In embodiments, the control system is configured for controlling positioning of the mobile separation device such that the separation device separates the intestine in the separation zone from the membrane at the (predetermined) longitudinal intestine position at a separation location (located at the membrane), wherein a minimal distance d1 between the separation location and the connection location at the (same) (predetermined) longitudinal intestine position is selected from the range of equal to 0, especially larger than 0, such as equal to or larger than 0.1 mm, especially equal to or larger than 0.5 mm, and equal to or smaller than 25 mm, such as equal to or smaller than 10 mm, especially equal to or smaller than 5 mm, more especially equal to or smaller than 3 mm. In embodiments, the distance d1 may be 0 mm. The distance d1 is especially non-zero.

Herein, the term "longitudinal intestinal position" relates to a longitudinal position of the intestinal. As discussed above, the small intestine is especially elongated (curved or coiled). The intestine may have a length from a first extreme of the intestine to another extreme of the intestine. The longitudinal position of the intestine relates to a position at the intestine along the length of the intestine. Herein, also a location remote from the intestine, such as at the membrane, may be indicated in relation to the longitudinal position of the intestine. In that respect the location (remote from the intestine) is especially located in a plane perpendicular to the longitudinal intestine axis comprising the respective longitudinal position of the intestine. For instance, herein it may be indicated that the intestine is separated from the bowel package at a given longitudinal intestine position. This especially indicates that the intestine is separated from the bowel package at a location (especially of the membrane) located in a plane perpendicular to the longitudinal intestine axis comprising the respective longitudinal position of the intestine (at the intestine). The term "longitudinal intestine position" may refer to a position remote from the intestine as well as a position at the intestine.

Separation especially comprises moving the intestine connected to the membrane in a first direction and concurrently moving the separation device in another direction (or second direction) such that membrane is cut with the separation device in the vicinity of the intestine. Especially, the separation device is moved in the direction of the connection location, especially in the direction of the separation location, during moving the intestine, to act on/contact/cut the membrane with the cutting member of the separation device or provided by the separation device. Herein the terms "act", "work", "operate" and the like in relation to separation may be used to indicate that the intestine is cut from the bowel package by a direct contact with the separation device and/or by a beam such as a laser beam of a water beam (jet) provided by the separation device and impinging on the membrane. For instance, in the phrase "the separation device is configured to act (operate) on the membrane at the separation location", the separation device may be positioned to contact the membrane at the separation location or the separation device is positioned away from the membrane and configured to impinge on the membrane (and cut the membrane) at the separation location with a beam or a jet.

When moving the intestine, at least part of the bowel package may be retained in the retaining zone. In embodiments, the retaining element retains at least part of the package remainder at the retaining location. The package remainder may e.g. be suspended at a suspension element. The suspension element may comprise a hook or a peg or another (static) element to secure the package remainder. The suspension element may especially be configured for allowing the intestine to pivot at a (imaginary) pivot location of the suspension element. The suspension element may define a pivot point for allowing the intestine (connected to the package remainder) to move in a radial direction (relative to the pivot point). This may further facilitate disentanglement of the bowel package upstream of the separation zone. In further embodiments, the package remainder may (additionally) be retained in or at a deposition element or support element, such as an open container or a platform or a tray. The retaining element may in embodiments be configured to retain the package remainder, e.g., by comprising friction elements, a rib, or a wall to prevent (substantial) moving of the package remainder (away) from the retaining location. In embodiments, the retaining element comprises a tray. The retaining element may comprise a bucket. In embodiments, the wall of the retaining element may comprise an opening or a guide. The opening or guide may e.g. be configured for guiding the (small) intestine out of the retaining element, especially while holding the package remainder (especially including the membrane) in the retaining element. The opening may e.g. comprise a V-shape or U-shape (for guiding the (small) intestine). The retaining element may in further embodiments (also) comprise the suspension element. For instance, a tray or other deposition element may comprise one or more wires, lines or e.g. chains (or comparable hanging elements) comprised by or connected to the suspension element. The one or more hanging elements may be connected to a fixed element (such as a pin or a peg) at the pivot location, especially allowing the deposition element to pivot at the pivot location. The deposition element may be hung with the hanging elements at the pivot location.

In further embodiments, the retaining element may comprise an at least partly rotatable retaining element. Rotating the element during transport of the intestine may facilitate in retracting the membrane that is cut from the intestine. In embodiments, this may help reducing a presence of already cut membrane in the sensing zone. The retaining element may e.g. in specific embodiments comprise an at least partly rotatable bucket, funnel, or e.g. tube, especially for arranging the package remainder inside of the (at least partly) rotatable retaining element (e.g. the bucket, funnel, tube) while arranging part of the membrane comprising the intestine over an edge of the (at least partly) rotatable retaining element (at the outside of the retaining element). The membrane may be connected to the (at least partly) rotatable retaining element using a clip, clamp or any other fixture element. Arranging the membrane over the edge of the (at least partly) rotatable retaining element may further facilitate arranging the intestine at rather constant distance from the edge of the retaining element along the length of the intestine. This way, the intestine may at least partly be aligned with the sensing area and/or transporting element. This may result in a reduction of a distance that the separation device needs to be moved (along the path) during use. Furthermore, such embodiments may further facilitate disentanglement of the intestine and membrane upstream of the separation zone.

In specific embodiments, the retaining element comprises one or more of a suspension element and a disposition element. The retaining element is especially configured for allowing movement of the intestine. The intestine may e.g. be danglingly arranged over an edge of the retaining element. Additionally or alternatively, the retaining element is configured mobile, such as being arranged pivotably at a pivot location.

The retaining location is especially configured relative to the sensor zone and the separation zone such that the (filled) intestine may straighten at least part of the membrane, especially based on gravity. During operation, the retaining location may be arranged further away from a base of the system than the sensor area (and the separation location). The retaining location may be configured at a first height or first plane (perpendicular to gravity) and the sensor area may be arranged at a second height or second plane (perpendicular to gravity) (relative to the base or the ground). In embodiments, a minimal (further) distance between the first plane and the second plane is in the range of 5-50 cm, especially 10-40 cm, such as in the range of 15-30 cm. Herein, the term "minimal (further) distance between the first plane and the second plane" especially relates to the distance along a line parallel to a direction of gravity.

It may further be advantageous to minimize a (second) distance (d2) between the retaining location and the location where the separation device acts on the membrane (the separation location) (during operation). The (minimal) distance d2 may in embodiments relate to a (minimal) distance between the retaining location and the separation zone. The (minimal) distance d2 may further relate to the (minimal) distance between the retaining location and the separation location being separated (during operation). The (minimal) distance d2 (between the retaining location and the separation location (being separated during operation)) may e.g. be equal to or smaller than 60 cm, such as equal to or smaller than 40 cm, such as equal to or smaller than 30 cm. Because the intestine (and membrane) is sensed (at the sensing area) between the retaining location and the separation location, the (minimal) distance d2 is especially at least 3 cm, such as at least 5 cm, especially at least 10 cm, e.g. at least 15 cm. The (minimal) distance d2 is in embodiments 5-60 cm, especially 10-30 cm. Hence, in further embodiments, a (minimal) distance (d2) between the retaining location and the separation zone (especially the cutting member of or provided by the separation device in the separation zone), more especially between the retaining location and the separation location (being separated) (during operation) is in the rage of 5-60 cm, especially in the range of 10-30 cm.

In embodiments, the sensor senses a parameter, and the connection location is determined by the control system based on the parameter. Herein, this may also be indicated as "the sensor senses the connection location", "the connection location is sensed by the sensor", "the sensor senses a shadow" and comparable phrases. This may be interpreted as the sensor senses a parameter and the element (such as connection location and shadow) is determined (by a control system/unit) based on the parameter. In embodiments, the sensor may comprise at least part of the control system. The sensor may e.g. comprise a control unit to determine the connection location based on the sensed parameter. The control unit may be part of the control system. The sensor may further be functionally coupled to the control system. The parameter is especially a measurable parameter. In embodiments, the sensor may sense radiation, see also below. The sensor may be a radiation sensor. The sensor may in embodiments sense one or more types of radiation selected from the group consisting of infrared radiation, visible light radiation, and ultraviolet radiation. The parameter may comprise a wavelength or a radiation frequency or a distribution of wavelength or frequencies. Moreover, the parameter may comprise a plurality of wavelength or a wavelength distribution. The sensor may especially be configured to sense the parameter over the sensing area. The parameter may especially comprise a distribution of radiation (over the sensing area). The parameter may e.g. be a distribution of radiant energy (at the sensing area). In embodiments the sensor is configured for sensing the parameter distributed over the sensing area. The term "sensor" may relate to a plurality of (different) sensors. Likewise, the term "parameter" may relate to a plurality of (different) parameters.

The sensing area may especially comprise a location of (a part of) the intestine combination with the membrane connected to the intestine in the sensing zone. The sensing area especially comprises the location momentarily being (configured for) sensed (sensing) in the sensing zone. The sensing area may be indicated for each longitudinal intestinal position.

The system may in further embodiments comprise a radiation source (or radiation emitter). In embodiments, the system comprises a sensor system comprising the radiation source. The sensor system may further comprise the sensor. The radiation source may in especially be selected for providing a minimized amount of heat, compared to radiation that is to be sensed by the sensor. In embodiments the radiation source comprises one or more Light Emitting Diodes (LEDs). The sensor may sense a part of a source radiation radiated (emitted) by the radiation source that is reflected by the intestine and the membrane attached to the intestine at the sensing area. Because of the different characteristics of the intestine and the membrane an amount and/or a distribution of the sensed (transformed) radiation sensed (at the sensing area) at the intestine may differ from the amount and/or distribution of the sensed (transformed) radiation sensed at a location of the membrane. The membrane and the intestine may absorb the radiation differently. During operation a first part of the (source) radiation may be blocked by the intestine (per $cm^2$ of intestine sensed), and a second part may be blocked by the membrane (per $cm^2$ of membrane sensed, wherein the first part is larger than the second part. Based on this difference, (transformed) radiation emitted from the intestine (and sensed by the sensor) differs from the (transformed) radiation emitted from the membrane (and sensed by the sensor). Based on this difference, the connection location (at the sensing area) may be determined. In further embodiments, the radiation source may be configured to radiate source radiation to the intestine and membrane and the sensor may be configured to sense (transformed) radiation passing through the intestine and the membrane (and emitted from the sensing area again).

Hence, in embodiments the sensor may sense a distribution of radiation over the sensing area (reflected by or transmitted through (the intestine and membrane at) the sensing area). The sensor may sense a difference in a (wavelength) distribution of the radiation at the sensing area. In embodiments the sensor may sense the transition of the membrane to the intestine (or the transition is determined based on the sensed parameter). In further embodiments, the sensor system comprises a dichromatic sensor system. The sensor or sensor system is in embodiments configured for sensing dark and light. In embodiments, the sensor may sense dark locations and light locations at the sensing area. The dark locations may especially correspond to the (at least partly filled) intestine and the light locations may correspond to the membrane. Herein, phrases like "sensing a distribution of radiation over the sensing area" especially relates to radiation transmitted through and/or reflected by the (intestine and membrane at) the sensing area. Herein, this radiation is also referred to as "transformed radiation" (to distinguish from "source radiation" being radiated by the radiation source)

Hence, in embodiments, the sensor is configured for sensing the parameter at a sensing area in the sensing zone. In further embodiments, the system, especially the sensor system, further comprises a radiation source for radiating source radiation, especially in a direction of the sensing area, and the sensor comprises a radiation sensor for sensing transformed radiation emitted from the sensing area. In further specific embodiments, the (source and especially also transformed) radiation comprises one or more types of radiation selected from the group consisting of infrared radiation, visible light radiation, and ultraviolet radiation.

In further embodiments, the radiation source is configured at a radiation source location and the radiation sensor is configured at a sensor location. The system may in embodiments be configured for moving the intestine between the radiation source location and the sensor location, especially wherein the parameter comprises a distribution of the radiation sensed by the radiation sensor over the sensing area. Herein the terms "sensed by the radiation sensor over the sensing area" especially related to (transformed) radiation emitted by the sensing area.

The radiation source may in embodiments be configured for emitting (visible) light radiation. In embodiments, e.g. the radiation source may provide (white) light at the intestine with a light intensity in the range of 5,000-50,000 lux, such as 10,000-20,000 lux. In further specific embodiments, the sensor system comprises a vision system, especially wherein the sensor is configured for sensing a shadow of an intestine (being arranged between the sensor and the radiation source), especially a shadow of the at least partly filled intestine attached to the membrane. The sensor system may especially sense different grades in the range of white-grey-black. The term "shadow" may especially relate to the (local) changes in the sensed different grades of white/grey/black. The sensor may comprise a black and white sensor, especially a sensor for sensing different grades in the range of white-grey-black. Especially the shadow is determined based on the sensed different grades in the range of white-grey-black.

As described above, the transporting element may in embodiments be configured for providing a pulling force onto the intestine (in the first direction). In embodiments, the transporting element comprises an intestine engagement element for engaging with the intestine to provide a pulling force (especially based on a friction force) onto the intestine (when moving the transporting element). The intestine engagement element may e.g. comprise a textured surface (for engaging with the (wall of the) intestine). The surface may be a rough surface and/or comprise a patter (or relief). The surface may comprise peaks and/or valleys. The peaks and/or valleys may in embodiments have a height/depth of equal to or smaller than 3 mm, such as equal to or smaller than 2 mm, especially equal to or smaller than 1 mm. A width of the peaks and/or the valleys (parallel to the surface) may be in the same range. A roughness parameter Ra (i.e. the arithmetic mean of the absolute departures of the roughness profile from the mean line of the surface) may be at least 0.1 µm, such as at least 1 µm, especially at least 10 µm, such as at least 50 µm. The roughness parameter Ra may in embodiments be equal to or smaller than 250 µm. The intestine engagement element may in embodiments be configured for only engaging with the intestine when moving in the first direction. The intestine engagement element may in further embodiments comprise fingers or strips that that engage with the (wall of the) intestine. The engagement element may be configured to provide the pulling force wherein a content of the intestine substantially remains in the intestine.

Herein the term "intestine engagement element" may relate to a plurality of (different) intestine engagement elements. The transporting element may in further embodiments comprise an intestine guiding element for guiding the intestine over or through the transporting element, especially over the surface of the transporting element. The guiding element may comprise a recess for hosting and guiding the intestine. In embodiments, the transporting element comprises a rotating (or rotatable) transporting element, such as a transport wheel or pulley. The intestine may be arranged at a circumferential surface of the rotatable transporting element. The circumferential surface may in embodiments be recessed (to receive the intestine in the recess) The rotatable transporting element may in embodiments comprise the recess, especially wherein the (circumferential) surface (for contacting the intestine), comprises the intestine engagement element.

Hence, in embodiments the transporting element comprises an intestine engagement element for engaging with the intestine to provide a pulling force onto the intestine to move the intestine (in the first direction).

The transporting element is in embodiments further configured for moving the intestine at a substantial constant velocity. In embodiments, the transporting element, is configured for moving the intestine at a velocity of 0.1-20 m/s, such as 0.5-10 m/s, especially 0.5-4 m/s, such as 0.75-3 m/s, especially 1-2 m/s. In embodiments, the transporting element, is configured for moving the intestine at a velocity of equal to or less than 20 m/s, such as equal to or less than 10 m/s. The velocity may especially be at least 0.1 cm/s, such as at least 0.5 m/s, especially at least 1 m/s, even more especially at least 2 m/s.

In further specific embodiments, the system is further configured for prearranging the bowel package (remote from the separation zone) prior to performing the separation. A first end of the intestine may be separated (manually) from the bowel package before or during prearranging and successively the rest of the intestine may be separated from the bowel package using the separation device. The system may in embodiments further comprises a transfer system for moving a first end of the intestine and the bowel package comprising at least the second end of the intestine to the retaining zone, especially the retaining location, and to the transporting element, respectively.

In embodiments, the system further comprises a prearrangement zone comprising an intestine receiving location and a package receiving location. The system may further comprise a transfer system configured for (i) receiving the first intestine end at the intestine receiving location, and for (ii) receiving the at least part the package remainder comprising the second intestine end at the package receiving location. In further embodiments, the transfer system is further configured for transferring the first intestine end from the intestine receiving location to the transporting element, and for (ii) transferring (at least part of) the bowel package, especially (at least part of) the package remainder from the package receiving location to the retaining zone, especially the retaining location, especially wherein the (at least part of) the bowel package, especially (the at least part of) the package remainder is provided to the retaining element.

In further specific embodiments, the transfer system comprises an intestine receiving element for receiving the first intestine end at the intestine receiving location (, the first intestine end being separated from the bowel package). In further embodiments, the transfer system further (also) comprises a package receiving element for receiving (the at least part of) the bowel package, especially (the at least part of) the package remainder (comprising the second intestine end), at the package receiving location. Alternatively, the transfer system comprises the retaining element, wherein the retaining element is configured mobile between the package receiving location and the retaining location. The retaining element is in embodiments further configured for receiving the at least part of the package remainder (comprising the second intestine end) at the package receiving location. In specific embodiments, the system, especially the transfer system, may e.g. comprise a first conveyor belt. The first conveyor belt may be configured from a first location (at least) comprising the intestine receiving location to a further location adjacent to the transporting element. The intestine receiving element may be coupled to or comprised by the first conveyor belt. By moving the first conveyor belt, the intestine receiving location may be moved. In further embodiments, the system, especially the transfer system, may further comprise an intestine transferring element configured adjacent to the transporting element for transferring the first intestine end from the intestine receiving element to the transporting element. Additionally or alternatively, the intestine receiving element may be configured to rotate to release first intestine end and provide it to the transporting element. The intestine receiving element may in embodiments, e.g., rotate at an end of the first conveyor belt (arranged adjacent to the transporting element). Yet, the (transporting) system may also comprise other options known to the skilled person.

In embodiments, the transfer system is further configured for (also) moving the package receiving element from the package receiving location to the retaining zone, especially the retaining location and for transferring the package remainder from the package receiving element to the retaining element at the retaining location. In further embodiments, the transfer system is further configured for moving the retaining element (comprising the package remainder, especially connected to the second intestine end) from the package receiving location to the retaining zone, especially to the retaining location.

Hence, in embodiments, the bowel package, especially the at least part of the package remainder, may be provided to the retaining element at the package receiving location and next, the retaining element (including bowel package/package remainder) may be moved to the retaining zone. In further embodiments, (at least part of) the bowel package/package remainder may be provided to the package receiving element at the package receiving location and the package receiving element is moved to the retaining zone (location), where (the at least part of) the bowel package/package remainder is transferred from the package receiving element to the retaining element. Moving the first intestine end and the bowel package/package remainder may especially be done concurrently. The transfer system is especially configured for concurrently moving the first intestine end and the bowel package.

In specific embodiments, the system, especially the transfer system may comprise a second conveyor belt. The second conveyer belt may be configured from a first location (at least) comprising the package receiving location to a further location adjacent or including the retaining location. The package receiving element or the retaining element may be coupled to or comprised by the second conveyor belt. By moving the second conveyor belt, the package receiving element or the retaining element may be moved. In further embodiments, the system, especially the transfer system, may further comprise a package transferring element configured adjacent to (or at) the retaining location for transferring the package remainder (bowel package) from the package receiving element to the retaining element at the retaining location.

In further embodiments the first conveyor belt and the second conveyor belt are mechanically coupled, especially to synchronize movement of the first intestine end and the bowel package/package remainder (comprising the second intestine end). Especially, in embodiments one or more of the first conveyor belt and the second conveyor belt may be substituted by a robotic arm. Especially, herein one or more of the terms "first conveyor belt" and "second conveyor belt" may in embodiments be replaced by "first robotic arm" and "second robotic arm", respectively. The transfer system may in embodiments, e.g., comprise a first robotic arm for moving the intestine from the intestine receiving element to the transporting element (and a second conveyor belt or a second robotic arm). In further embodiments, the transfer system may comprise a second robotic arm for transferring the package remainder (bowel package) from the package receiving location to the retaining location (and a first container belt or a first robotic arm.)

Herein the terms "intestine receiving element", "package receiving element", and "retaining element" may relate to a plurality of intestine receiving elements, package receiving elements, and retaining elements, respectively. The transfer system may e.g. comprise at least two intestine receiving elements and two retaining elements (or two package receiving elements) allowing to prearrange (in the prearrangement zone) a first bowel package and a first end of a respective intestine at a first retaining element (or first bowel package receiving element) and a first intestine receiving element, respectively; and concurrently separating a respective intestine from a second bowel package in the separation zone. Hence, in embodiments, the system may comprise a plurality of bowel packages, arranged in different zones of the system.

In further specific embodiments, positioning the first intestine end at the transporting element may be facilitated by a couple element, such as a clip or a hook, etc. Such couple element may be attached to the first intestine end. A clip may e.g. be arranged around the first intestine end (and especially thereby closing the first intestine end). The transporting element may be configured for engaging with or receiving the couple element in a coupling receiving element to position the first intestine end in such a way that moving the intestine may be assisted. The coupling receiving element may, e.g., comprise a groove, a notch, a rib or a rim. In further embodiments one or more of the couple element and the coupling receiving element may be magnetic and the elements may be configured to attract each other. In further embodiments, the transporting element and/or the system may comprise a detaching element for removing the couple element (again) when moving the intestine (in the first direction). The detaching element is especially configured for detaching the couple element from the intestine during moving the intestine. The detaching element may in embodiments e.g. be configured to open the clip or to block a hook. The system especially comprises the detaching element configured, especially adjacent to the transporting element, for detaching the couple element (during moving the intestine). Hence, in embodiments, the transporting element comprises a coupling receiving element configured for engaging with a couple element attached to the intestine, wherein the system is further configured for detaching the couple element from the intestine when moving the intestine to the collecting zone.

As described above, the invention (also) provides in an aspect the method for separating an intestine from a bowel package ("method"). The bowel package especially comprising a package remainder and a membrane connecting the intestine to the package remainder. Further, especially, the method comprises the preparation stage, the arranging stage and the separation stage. In embodiments, the method comprises providing the system described herein. The invention especially provides embodiments of the method, wherein the preparation stage comprises manually separating a first intestine end from the membrane of a bowel package. The arranging stage especially comprises: providing the first intestine end to a transporting element and providing at least part of the package remainder of the bowel package (comprising a second intestine end) to a retaining element in a retaining zone, especially wherein the retaining element is configured for holding the at least part of the package remainder. In specific embodiments, the arranging stage comprises: providing the first intestine end to a transporting element and holding at least part of the package remainder of the bowel package comprising a second intestine end, at a retaining element in a retaining zone. The inventions further especially provides embodiments of the method, wherein the separation stage comprises: (i) moving the intestine in a direction from the retaining zone to a collecting zone, wherein the intestine is moved through a separation zone via a sensing zone, especially while straightening (at least partly based on gravity) (at least part of) the membrane in (both) the sensing zone and in the separation zone (while moving the intestine); (ii) sensing a parameter of the intestine in the sensing zone (as a function of a longitudinal intestine position), wherein the parameter relates to a connection location connecting the intestine to the membrane (in the sensing zone) and determining the connection location (as a function of the longitudinal intestine position) based on the sensed parameter (as the function of the longitudinal intestine position), and (iii) separating the intestine from the membrane (at a separation location located at the membrane) with a mobile separation device, especially comprising a cutting device selected from the group consisting of a static blade cutter, a rotating blade cutter, an oscillating blade cutter, and a cutting wire, even more especially comprising a rotating blade cutter, by controlling positioning of the mobile separation device such that the separation device separates the intestine in the separation zone from the membrane at a (predetermined) longitudinal intestine position based on the connection location determined from the parameter sensed in the sensing zone at the (predetermined) longitudinal intestine position.

In embodiments, (controlling) positioning (of) the mobile separation device especially comprises (controlling) moving the separation device along a path or in a predetermined space, especially wherein a cutting member of the separation device or provided by the separation device separates the intestine from the membrane in the in the separation zone.

In further embodiments, the separation stage (further) comprises: (i) radiating (source) radiation in a direction of a sensing area in the sensing zone, wherein the sensing area comprises the intestine (connected to the membrane), and sensing (transformed) radiation emitted from the sensing area, with the sensor, especially wherein the sensor is configured downstream of the intestine relative to a propagation of the radiation, and (ii) determining the connection location (as a function of the longitudinal intestine position) based on a distribution of the radiation sensed by the sensor over the sensing area. The radiation may especially be selected from the group consisting of infrared radiation, visible light radiation, and ultraviolet radiation. Further, sensing the radiation with the sensor may especially relate to sensing a distribution of the radiation over the sensing area (especially relative to the distribution of the emitted radiation). In embodiments (visible) light radiation is emitted (radiated). In further specific embodiments, the sensor is part of a sensor system comprising a vision system, especially wherein the sensor is configured for sensing a shadow of an intestine (being arranged between the sensor and a radiation source emitting the radiation), especially a shadow of the at least partly filled intestine attached to the membrane.

In further embodiments, the preparation stage further comprises: providing the first intestine end (being manually separated from the membrane) to an intestine receiving location of a transfer system, and providing (the at least part of the bowel package, especially (the at least part of) the package remainder comprising the second intestine end to a package receiving location of the transfer system. Further, the arranging stage may further comprise: transferring the first intestine end from the intestine receiving location to the transporting element, and transferring (the at least part of the bowel package, especially) the (at least part of the) package remainder from the package receiving location to the retaining zone, especially to the retaining location, especially whereby the at least part of the package remainder is provided to the retaining element.

In further specific embodiments, the preparation stage comprises: providing the first intestine end being manually separated from the membrane to an intestine receiving element of the transfer system, especially to provide the first intestine end being manually separated from the membrane to the intestine receiving location of the transfer system. The preparation stage may further comprise providing the at least part the package remainder comprising the second intestine end to a package receiving element at the package receiving location of the transfer system. Alternatively, the preparation stage may comprise providing the at least part the package remainder comprising the second intestine end to the (movable) retaining element at the package receiving location; especially wherein the retaining element is configured mobile between the package receiving location and the retaining location. In further specific embodiments, the arranging stage comprises: transferring the intestine receiving element from the intestine receiving location to a location (adjacent) of the transporting element and successively transferring the first intestine end to the transporting element. Further, especially the arranging stage (also) comprises: transferring the package receiving element comprising the at least part of the package remainder from the package receiving location to the retaining zone and successively transferring the at least part of the package remainder to the retaining element at the retaining location. Alternatively, the arranging stage may (also) comprise transferring the retaining element comprising the at least part of the package remainder from the package receiving location to the retaining location.

In further embodiments, the arranging stage (further) comprises: attaching a couple element to the first intestine end prior to providing the first intestine end to the intestine receiving element; engaging the couple element with a coupling receiving element of the transporting element (to engage the first intestine end with the transporting element); and by moving the intestine, detaching the couple element from the intestine.

In further embodiments, the method further comprises radiating (emitting) radiation to the sensing area and sensing the radiation with the sensor, wherein the sensor is arranged downstream from the intestine relative to a propagation of the radiation, and determining the connection location based on the radiation being sensed over the sensing area, especially as a function of a longitudinal intestine position.

The first intestine end (being separated from the bowel package) may especially comprise an end of the (small) intestine closest to a stomach (before operation). Further, especially the second intestine end may have been separated from the large intestine before operation (wherein the large and small intestine are still connected to each other by the membrane). Alternatively, the first intestine end (being separated from the bowel package) may comprise an end of the (small) intestine closest to the large intestine and the second intestine end may be an end of the (small) intestine closest to the stomach.

The embodiments described above in relation to the system of the present invention, may also apply for the method and use of the invention.

Herein the terms "upstream and "downstream" are used, such as in phrases like "The sensor is configured downstream of the radiation source position (or relative to the propagation of the radiation)", and "The separation device (or location) is arranged downstream of the sensing area". The terms "upstream" and "downstream" relate to an arrangement of items or features relative to the propagation of an element such as the intestine along a process line/system, or light/radiation in a beam of light/radiation (during operation), wherein relative to a first position along the process line, or within the beam, a second position along the line or within the beam closer to a feed (for the intestine), especially closer to the retaining location, or closer to a radiation source respectively is "upstream", and a third position along the process line further away from the feed, or further away from the radiation source, respectively is "downstream". Hence, during operations the intestine may be moved from an upstream location to a downstream location. When viewed in a direction of movement of the intestine along the process line, the longitudinal position of the intestine ranges from the upstream side to the downstream side.

The term "controlling" and similar terms herein especially refer at least to determining the behavior or supervising the running/operating of an element, e.g. the separation device. Hence, herein "controlling" and similar terms may e.g. refer to imposing behavior to the (controllable) element (determining the behavior or supervising the running of an element), etc., such as e.g. measuring, displaying, actuating, opening, shifting, changing temperature, etc., especially actuating. Beyond that, the term "controlling" and similar terms may additionally include monitoring. Hence, the term "controlling" and similar terms may include imposing behavior on an element and also imposing behavior on an element and monitoring the element. The controlling of the element can be done with the control system. The control system and the (controllable) element may thus at least temporarily, or permanently, functionally be coupled. The element may comprise at least part of the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
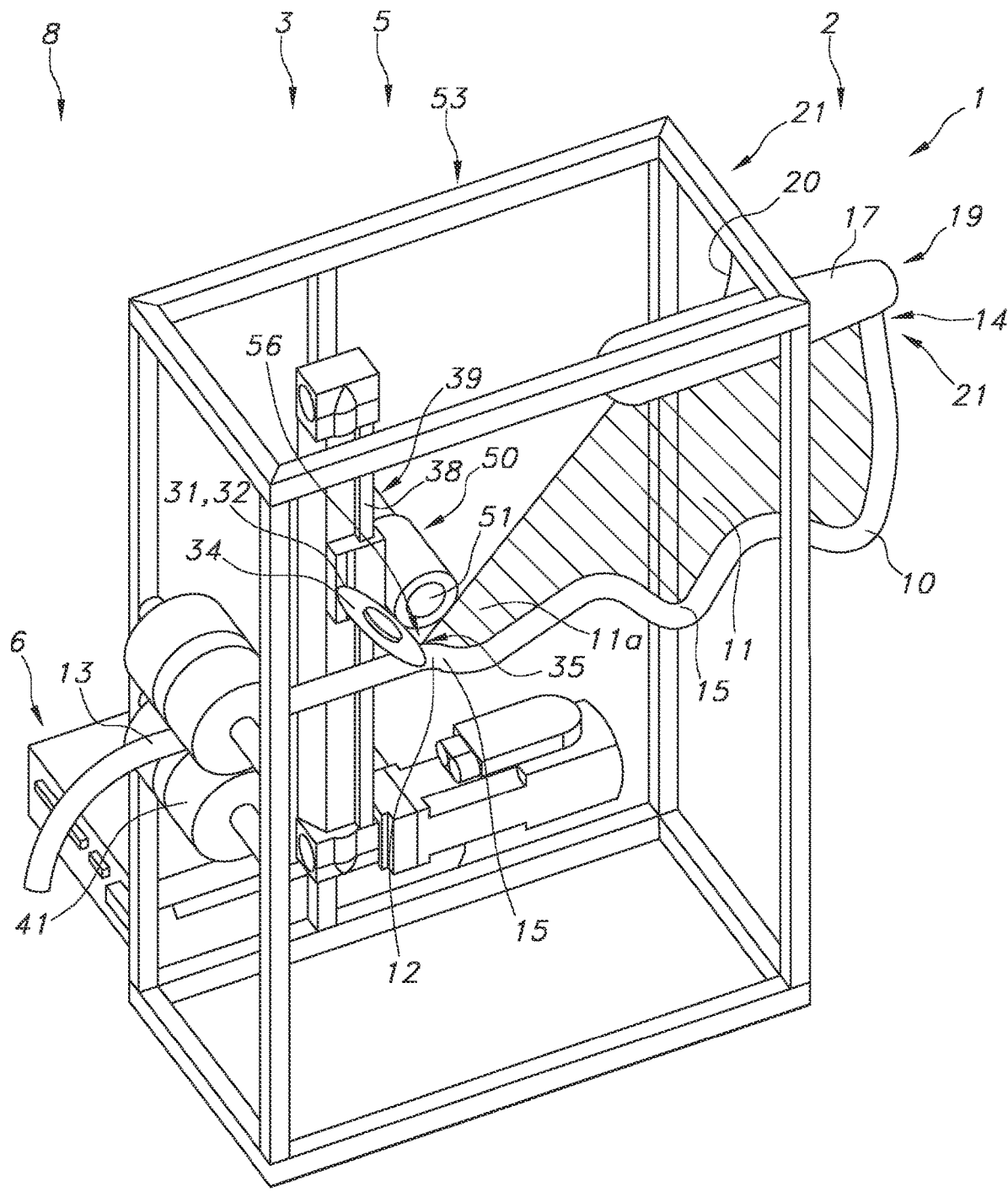
FIG. 1 schematically depicts an embodiment of the system of the invention.

FIG. 1 schematically depicts an embodiment of the system 1. The system 1 is especially configured for separating an intestine 10, especially a small intestine 10, from a bowel package 19. The bowel package 19 comprises a package remainder 17 and a membrane 11 connecting the intestine 10 to the package remainder 17. Therefore, it may also be described herein that the system 1 (and the method) may be configured for separating the intestine 10 from the membrane 11. The system 1 especially comprises a retaining zone 2 comprising a retaining location 21, a separation zone 3, a sensing zone 5 and a collecting zone 8. The system further comprises a transporting element 41.

In the embodiment, (the package remainder 17 of) the bowel package 19 is arranged at a retaining element 20 at a retaining location 21 (in the retaining zone 2). The second intestine end 14 is at least attached to the membrane 11 of the bowel package 19 at the retaining location 21. The second intestine end 14 may already have been cut from the package remainder 17.

The transporting element 41 is especially configured for engaging with a first intestine end 13 and especially configured for moving the intestine 10 in a direction from the retaining zone 2 to the collecting zone 8, wherein the intestine 10 is moved via the sensing zone 5 through the separation zone 3 (arranged downstream from the sensing zone 5). The system 1 comprises a sensor 51 for sensing in the sensing zone 5 a parameter of the intestine 10 related to a connection location 15 connecting the intestine 10 to the membrane 11.

Further a control system 6 is depicted. The control system is functionally coupled to the system 1 or is part of the system 1. The control system 6 is at least configured for controlling positioning of a mobile separation device 31 during moving the intestine 10 such that the mobile separation device 31 separates the intestine 10 in the separation zone 30 from the membrane 11, especially at a separation location 35 (being determined by the control system 6). The separation location 35, at a predetermined longitudinal intestine position 12, is based on the connection location 15 determined from the parameter sensed in the sensing zone 5 at the predetermined longitudinal intestine position 12. The depicted embodiment of the system 1 is further configured for straightening the membrane 11 (at least partly) in the sensing zone 5 and in the separation zone 3. This may further facilitate the determination of the connection location 15 and the separation at the separation location 35. In the depicted embodiment at least a first membrane part 11a comprising the sensing area 56 being sensed (see FIG. 2A) and the separation location 35 at which the intestine 10 is concurrently being separated from the bowel package 19 may be straightened (configured for straightening). Straightening is especially based on moving the intestine 10 in combination with gravity acting on the at least partly filled intestine 10.

The embodiment comprises the mobile separation device 31. The separation device 31 is especially configured mobile along a path 39 or in a predetermined space (only the path 39 is indicated). Moreover, the depicted embodiment comprises a linear guiding system 38 defining the path 39. The separation device may be coupled to or comprising the linear guiding system 38. The path 39 is not necessary a physical track. The path 39 may also not be straight in further embodiments. The path 39 may e.g. comprise a path/track of a robotic arm connected to or being part of the separation device 31.

The system 1 further comprises a sensor 51, which may be part of a sensor system 50. The sensor 51 is especially configured for sensing at a sensing area 56 (see FIG. 2a) the parameter related to the connection location 15. Herein, the location downstream of the sensor 51 or downstream of the sensor zone 5 especially relates to a location downstream of a location being sensed by the sensor 51. The sensor 51 may be arranged further remote from the location being sensed (the sensing area 56). However, it will be understood that the location being sensed by the sensor 51 is more relevant than the physical location of the sensor 51. At least the sensing area 56 is especially arranged in the sensing zone 5.

In the depicted embodiments, the separation device 31 comprises a rotating blade cutter 32. Also the embodiment depicted in FIG. 2a comprises a rotating blade cutter 32. A rotating blade cutter 32 as well as e.g. a static blade cutter, an oscillating blade cutter, and a cutting wire may cut the membrane 11 by a direct physical contact between the (cutting member, such as blade 34 or wire of the) separation device 31 and the membrane 11. In alternative embodiments, the separation device 31 may comprise a cutting member such as a beam or jet that may impinge/act on the membrane 11 and providing sufficient energy to the membrane 11 that the beam or jet may cut the membrane 11. Examples of a separation device 31 comprising a beam or jet are a waterjet cutting device 33 as depicted in FIG. 2b and a laser cutting device.

Figure 2A:
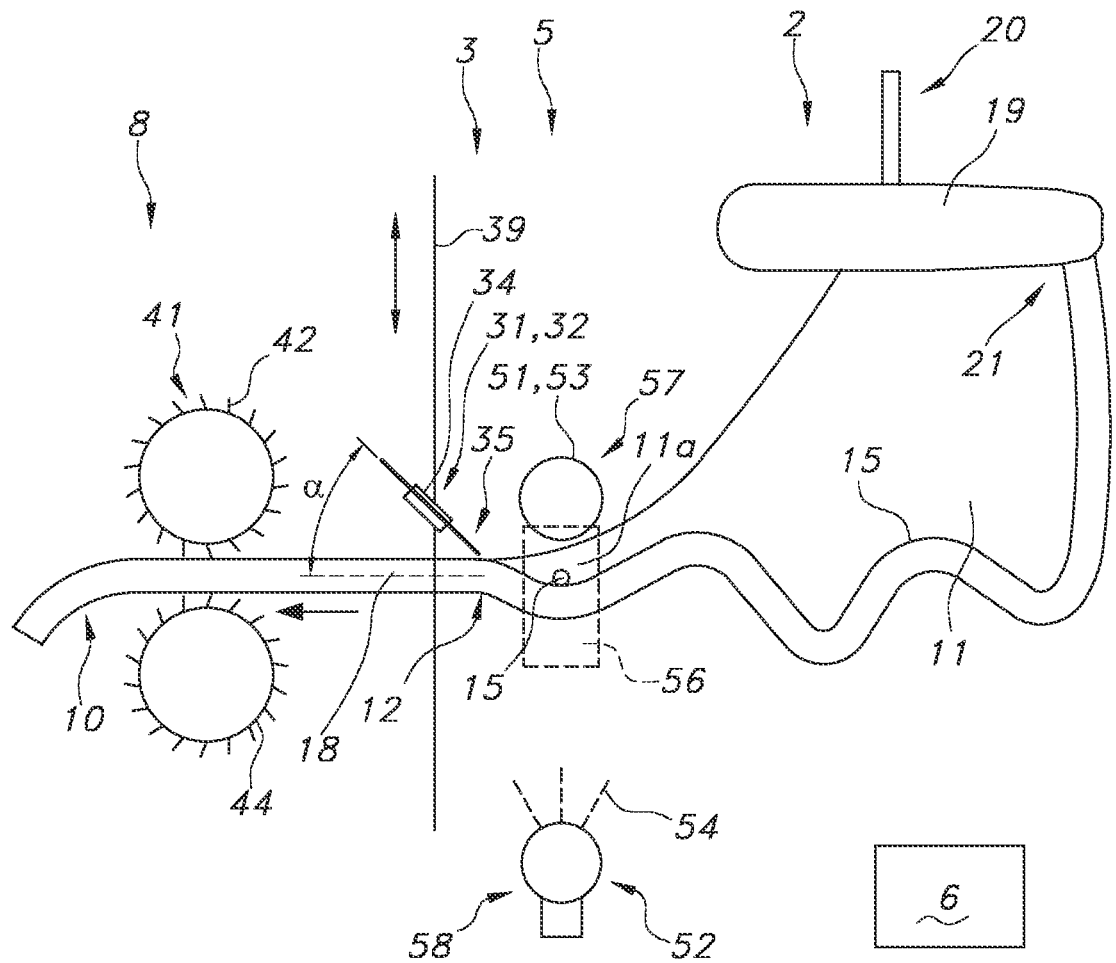
FIGS. 2a and 2b depict some aspects of the system.
Figure 2B:
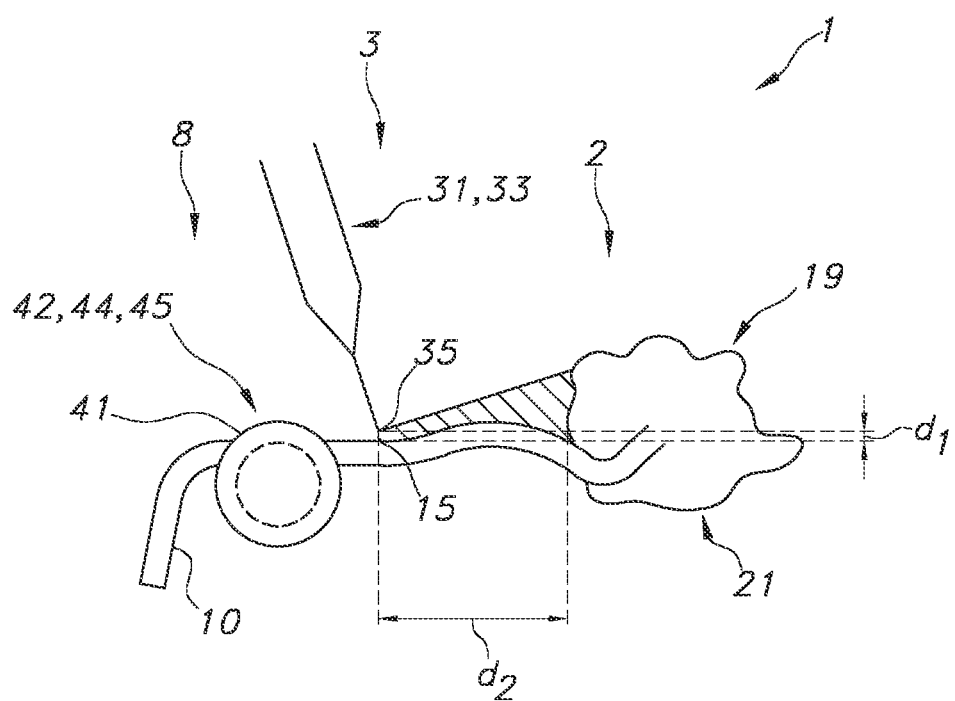

In FIG. 2a further the first direction in which the intestine 10 is moved by the transporting element 41 is indicated by the (single) arrow. In the embodiment, the longitudinal intestine axis 18 (at the separation location 35) is parallel to the first direction. Yet in further embodiments, the first direction and the longitudinal intestine axis 18 may define an angle α. That angle α, though, may in embodiments be rather small, such as less than 25°, or less than 10°. In the figure, the angle α defined by the intestine axis 18 and the blade 34 of the rotating blade cutter 32 is depicted. That angle α is in embodiments in the range of 0-90°, such as in the range of 60-90°. In the depicted embodiments of FIG. 1 and FIG. 2a, the angle α is indicated as about 45°, especially for illustrative reasons. Yet in further embodiments, the angle α is substantially (almost) 90°. FIG. 2a further illustrates by the double headed arrow that in the embodiment the separation device 31 may be moved along path 39 which is in the embodiment substantially perpendicular to the first direction and to the intestine axis 18 at the separation location 35. For the given embodiment the double headed arrow especially indicates the second direction that may alternate during operation (such as between the up and down direction).

In the embodiment of FIG. 2a also a radiation source 52 is schematically depicted. The radiation source 52 is configured for emitting/radiating (source) radiation 54 in a direction of the intestine 10, especially to the sensing area 56. The radiation 54 may in embodiments comprise one or more of infrared radiation and visible light radiation and ultraviolet radiation. The radiation source 52 may e.g. comprise one or more Light Emitting Diodes (LEDs) providing the radiation 54. At least part of the source radiation 54 may be sensed by the sensor 51 comprising a radiation sensor 53 (as transformed radiation 54). Another part of the source radiation 54 may be absorbed by the intestine 10 and the membrane 11, especially wherein the intestine 10 and the membrane 11 may absorb different amounts or e.g. frequencies of the radiation 54. Based on a distribution of the radiation 54 sensed over the sensing area 56 the intestine 10 may be distinguished from the membrane 11. In embodiments, the system 1 is configured for sensing (transformed) radiation 54 reflected by the intestine 10 and the membrane 11. The embodiment of FIG. 2a is configured for sensing (transformed) radiation 54 transmitted through the intestine 10 and the membrane 11. In the embodiment, the radiation source 52 and the radiation sensor 53 are configured at opposite sides of the intestine 10. In embodiment the parameter may comprise (a distribution of) an amount or level of the radiation 54 sensed by the radiation sensor 53 over the sensing area 56.

It is noted that (although not clearly visible in FIG. 2a) the retaining element 20 is especially configured for allowing free movement of the intestine 10. In the depicted embodiment, the intestine 10 is arranged pivotably at the retaining element 20. In other embodiments, the retaining element 20 may e.g. comprise a tray that is swingingly arranged at a (physical) pivot point (of the system 1 (not depicted in the figures)).

In specific embodiments, the sensor system 50 comprises a vision system. The sensor 51 may be configured for sensing a shadow of an intestine 10 being arranged between the sensor 51 and the radiation source 52, and the radiation source 52 may be configured for radiating (emitting) visible light radiation. As such, especially the at least partly filled intestine 10 attached to the membrane 11 may provide the shadow.

FIG. 2a further also depicts an embodiment of the transporting element 41. The transporting element 41 comprises two rotating (rotatable) transporting elements 41 (or members) comprising intestine engagement elements 42 configured at the circumferential surface 44. The intestine engagement elements 42 may e.g. comprise (rubber) fingers imposing a friction force on the intestine 10 and therewith moving the intestine 10 when rotating. The intestine engagement elements 42 may thus provide a pulling force onto the intestine 10 to move the intestine 10. The transporting element 41 may in embodiments comprise (only) one single rotatable transport element 41, see e.g. FIG. 2b.

In FIG. 2b, another embodiment of the transporting element 41 is depicted. The transporting element 41 comprises a rotating transporting element 41 with a recess 45 (in the circumferential surface 44) for receiving the intestine 10. Although not visible, the transporting element 41 may also comprise an intestine engagement element 42. The circumferential surface/the surface 44 of the recess 45 (indicated by the dotted line) may e.g. comprise a rough surface 44 and/or a pattern or relief that may engage with the (wall of the) intestine 10. The surface 44 may comprise a textured surface 44.

FIG. 2b further depicts some distances described herein (depicted in relation to embodiments comprising a waterjet cutter 33, but they may also relate to other types of separation devices 31). The distance d1, indicated in FIG. 2b, indicates the distance between separation location 35 and the connection location 15 (for the same longitudinal intestinal position 12) and especially relates to the part (or strip) of the membrane 11 that is not separated from the intestine 10. Preferably all membrane 11 would be removed from the intestine 10. However, for practical reasons this is hardly possible, especially at the desired transport velocities of the intestine 10. In embodiments, the transporting element 41 is configured for moving the intestine 10 at a velocity of at least 1 m/s. Therefore, in embodiments, the control system 6 is configured for controlling positioning of the separation device 31 wherein the distance d1 between the separation location 35 at any longitudinal intestine position 12 and the connection location 15 for the (same) longitudinal intestine position 12 is especially equal to or larger than 0 mm and e.g. equal to or smaller than 25 mm, such as ≤10 mm, especially≤5 mm.

The distance d2 indicated in the figure indicates the (minimal) distance between the retaining location 21 and the separation zone 3, especially the separation location 35. It is noted that in other embodiments, in which the separation device 21 directly contacts the intestine during cutting (such as given in FIG. 2a), d2 also may indicate the (minimal) distance between the retaining location 21 and the separation element 31 (such as the blade 34). In embodiments, the (minimal) distance d2 is in the rage of 0-30 cm.

Figure 3:
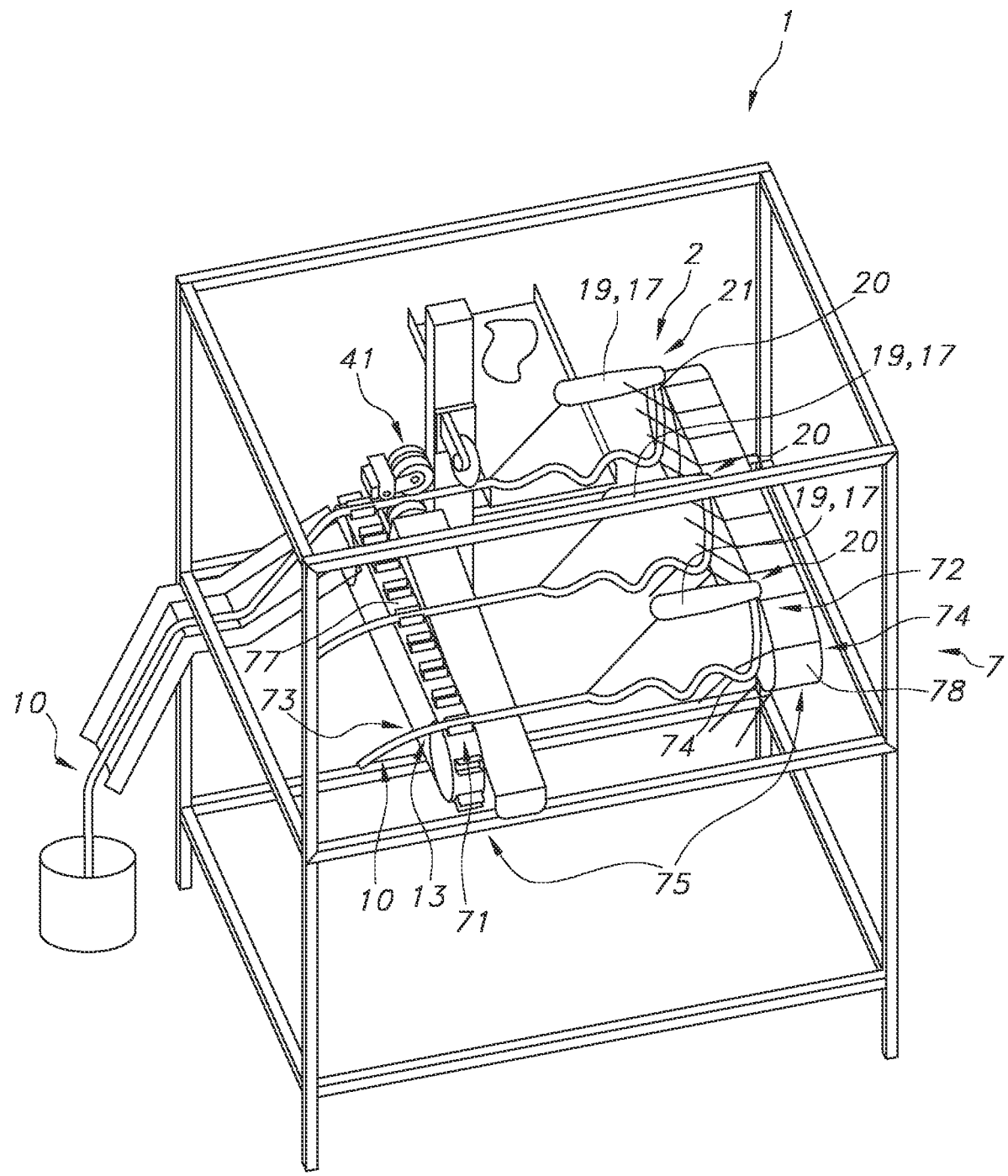
FIG. 3 depict a further embodiment of the system.

In FIG. 3 a further embodiment of the system 1 is depicted. The embodiment (further) comprises prearrangement zone 7 comprising an intestine receiving location 73 and a package receiving location 74. The system 1 further comprises the transfer system 75 comprising an intestine receiving element 71 for receiving a first intestine end 13 at the intestine receiving location 73 (the first intestine end 13 already being separated from the bowel package 19). The transfer system 75 further comprises the (movable) retaining element 20, wherein the retaining element 20 is further configured for receiving the bowel package 19, especially the package remainder 17, (comprising a second intestine end 14) at the bowel receiving location 74. The transfer system 75 is configured for moving the intestine receiving element 71 from the intestine receiving location 73 to a location of the transporting element 41 and for transferring the first intestine end 13 to the transporting element 41, especially wherein the first intestine end 13 is engaged with the transporting element 41. To move the intestine receiving element 71, the intestine receiving element 71 of the embodiment is coupled to a first conveyor belt 77. The transfer system 75 is further configured for moving the movable retaining element 20 (comprising the bowel package 19/the package remainder 17) from the bowel receiving location 74 to the retaining zone 2. In the embodiment, the system 1 comprises a second conveyor belt 78 and the retaining element 20 is coupled to the second conveyor belt 78. The first conveyor belt 77 especially extends from the intestine receiving location 73 to a location adjacent to the transporting element 41. The second conveyor belt 78 especially extends from bowel package receiving location 74 to a location adjacent to or comprising the retaining location 21.

In alternative embodiments, the transfer system 75 further comprises a bowel package receiving element 72 (only the location thereof is indicated in the figure) for receiving the bowel package 19 at a bowel receiving location 74. The bowel package receiving element 72 may have any arbitrary shape able to support the bowel package 19, and may, e.g., also comprise a hook as indicated in the figure in relation to the retaining element 20. In the alternative embodiments, the transfer system 75 may further be configured for moving the bowel package receiving element 72 from the bowel receiving location 74 to the retaining location 21 and for transferring the bowel package 19 from the bowel package receiving element 72 to the retaining element 20 at the retaining location 21. Also such embodiments may comprise the second conveyor belt 78, especially wherein the bowel receiving element 72 is coupled to the second conveyor belt 78. Such system 1 may further comprise a transfer element for transferring the bowel 19 from the bowel package receiving element 72 to the retaining element 20 at the retaining location 21 (not shown).

Figure 4:
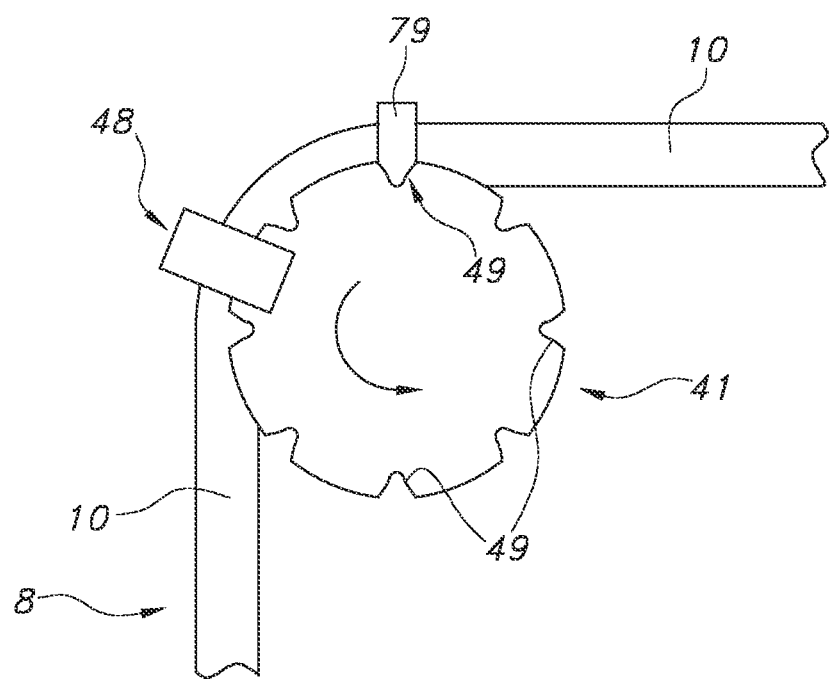
FIG. 4 depicts some further aspects of the invention. The schematic drawings are not necessarily to scale.

In FIG. 4 an embodiment of the transporting element 41 comprising a coupling receiving element 49 is depicted. The coupling receiving element 49 is configured for engaging with (such as receiving) a couple element 79 attached to the intestine 10. The coupling receiving element 49 may e.g. have a shape (e.g. a recess) that corresponds to a shape of the couple element 79. Yet, engaging with the couple element 79 may in further embodiments be based on a magnetic coupling and the coupling receiving element 49 may e.g. attract the couple element 79. The couple element 79 is especially configured for not damaging the intestine 10 when being used (such as during attaching or removing). The system 1 further comprises a coupling removing element 48. As such, the system 1 is configured for detaching the couple element 79 from the intestine 10 during moving the intestine 10.

The system 1 may be used in the method of the invention. In the method especially a first intestine end 13 is separated from the bowel package 19; the first intestine end 13 is provided to a transporting element 41 and the bowel package 19 (or the package remainder 17) is provided to a retaining element 20 at a retaining location 21; the intestine 10 is moved in a direction from the retaining location 21 to the collecting zone 8 (herein also indicated as the first direction) by the transporting element 41; and (i) a parameter related to a connection location 15 of a membrane 11 of the bowel package 19 to the intestine 10 is sensed in the sensing zone 5, especially (configured) upstream of the transporting element 41 and downstream of the retaining zone 2. The connection location 15 is especially determined as a function of a longitudinal intestine position 12 based on the sensed parameter. The intestine 10 is (further downstream of the sensing zone 5) separated from the bowel package 19/from the membrane 11 with a mobile separation device 31 (at a separation location 35 located at the membrane 11) by moving the mobile separation device 31 (along a path 39). Especially, for each longitudinal intestine position 12 the separation location 35 is based on the connection location 15, Moreover, during sensing and separating, the intestine 10 may be moved continuously (in the first direction).

Further, in embodiments, radiation 54 is emitted to the sensing area 56 and sensed with the sensor 51 downstream from the intestine 10 relative to a propagation of the radiation 54, and the connection location 15 is determined based on an amount of radiation 54 being sensed over the sensing area 56 as a function of a longitudinal intestine position 12.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system. The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for separating an intestine from a bowel package, wherein the bowel package comprises a package remainder and a membrane connecting the intestine to the package remainder; wherein the system comprises (i) a retaining zone comprising a retaining location, (ii) a separation zone, (iii) a sensing zone, (iv) a collecting zone, (v) a retaining element, (vi) a transporting element, (vii) a sensor, and (viii) a control system; wherein the retaining element is configured for holding at least a part of the package remainder at the retaining location, wherein a second intestine end is attached to the package remainder;

the transporting element is configured for engaging with a first intestine end separated from the membrane and for moving the intestine in a direction from the retaining zone to the collecting zone, wherein the intestine is moved through the separation zone via the sensing zone; wherein the system is configured for straightening the membrane in the sensing zone and in the separation zone;
the sensor is configured for sensing in the sensing zone a parameter of the intestine, relating to a connection location connecting the intestine to the membrane;
the control system is configured for controlling positioning of a mobile separation device during moving the intestine such that the mobile separation device separates the intestine in the separation zone from the membrane at a predetermined longitudinal intestine position based on the connection location determined from the parameter sensed in the sensing zone at the predetermined longitudinal intestine position.

2. The system according to claim 1, wherein the mobile separation device comprises a cutting device selected from the group consisting of a rotating blade cutter and a waterjet cutting device.

3. The system according to claim 2 comprising the rotating blade cutter, wherein a longitudinal intestine axis and a blade of the separation device in the separation zone define an angle ($\alpha$) selected in the range of 60-90°.

4. The system according to claim 1, wherein the control system is configured for controlling positioning of the mobile separation device such that the separation device separates the intestine in the separation zone from the membrane at the predetermined longitudinal intestine position at a separation location located at the membrane, wherein a minimal distance (d1) between the separation location and the connection location at the predetermined longitudinal intestine position is selected from the range of larger than 0.1 mm and equal to or smaller than 25 mm.

5. The system according to claim 4, wherein a minimal distance (d2) between the retaining location and the separation location during operation being separated is in the rage of 10-30 cm.

6. The system according to claim 1, wherein the sensor is configured for sensing the parameter at a sensing area in the sensing zone, wherein the system further comprises a radiation source for radiating source radiation in a direction of the sensing area, and wherein the sensor comprises a radiation sensor for sensing transformed radiation emitted from the sensing area, wherein the radiation comprises one or more types of radiation selected from the group consisting of infrared radiation, visible light radiation, and ultraviolet radiation.

7. The system according to claim 6, wherein the radiation source is configured at a radiation source location and the radiation sensor is configured at a sensor location, wherein the system is configured for moving the intestine between the radiation source location and the sensor location, wherein the parameter comprises a distribution of the radiation sensed by the radiation sensor over the sensing area.

8. The system according to claim 7, wherein the system comprises a sensor system comprising the sensor and the radiation source, wherein the sensor system comprises a vision system, wherein the sensor is configured for sensing a shadow of the intestine, and wherein the radiation source is configured for radiating visible light radiation.

9. The system according to claim 6, wherein the radiation source comprises one or more Light Emitting Diodes (LEDs).

10. The system according to claim 1, wherein the transporting element comprises an intestine engagement element for engaging with the intestine to provide a pulling force onto the intestine to move the intestine, wherein the intestine engagement element comprises a textured surface.

11. The system according to claim 1, wherein the transporting element is configured for moving the intestine at a velocity of 0.5-10 m/s.

12. The system according to claim 1, further comprising a prearrangement zone comprising an intestine receiving location and a package receiving location, wherein the system further comprises a transfer system configured for (i) receiving the first intestine end at the intestine receiving location, and for (ii) receiving the at least part the package remainder comprising the second intestine end at the package receiving location; wherein the transfer system is further configured for (i) transferring the first intestine end from the intestine receiving location to the transporting element, and for (ii) transferring the at least part of the package remainder from the package receiving location to the retaining location, wherein the at least part of the package remainder is provided to the retaining element.

13. The system according to claim 12, wherein the transfer system comprises an intestine receiving element for receiving the first intestine end at the intestine receiving location, and
(i) the transfer system further comprises a package receiving element for receiving the at least part of the package remainder at the package receiving location, or
(ii) the transfer system comprises the retaining element, wherein the retaining element is further configured for receiving the at least part of the package remainder at the package receiving location, wherein the retaining element is configured mobile between the package receiving location and the retaining location.

14. The system according to claim 1, wherein the transporting element comprises a coupling receiving element configured for engaging with a couple element attached to the first intestine end, wherein the system further comprises a coupling removing element configured for detaching the couple element from the intestine when moving the intestine to the collecting zone.

15. A method for separating an intestine from a bowel package, wherein the bowel package comprises a package remainder and a membrane connecting the intestine to the package remainder; wherein the method comprises a preparation stage, an arranging stage and a separation stage;
wherein the preparation stage comprises: manually separating a first intestine end from the membrane of a bowel package;
wherein the arranging stage comprises: (i) providing the first intestine end to a transporting element and (ii) holding at least part of the package remainder of the bowel package comprising a second intestine end, at a retaining element in a retaining zone; and
wherein the separation stage comprises: moving the intestine in a direction from the retaining zone to a collecting zone, wherein the intestine is moved through a separation zone via a sensing zone, while straightening the membrane in the sensing zone and in the separation zone; and while moving the intestine: (i) sensing a parameter of the intestine in the sensing zone, wherein the parameter relates to a connection location connecting the intestine to the membrane, and determining the connection location based on the sensed parameter, and (ii) separating the intestine from the membrane with a mobile separation device, by controlling positioning of the mobile separation device such that the separation device separates the intestine in the separation zone from the membrane at a predetermined longitudinal intestine position based on the connection location determined from the parameter sensed in the sensing zone at the predetermined longitudinal intestine position.

16. The method according to claim 15, wherein the mobile separation device comprises a cutting device selected from the group consisting of a rotating blade cutter and a waterjet cutting device.

17. The method according to claim 15, wherein the separation stage comprises: (i) radiating source radiation in a direction of a sensing area in the sensing zone, wherein the sensing area comprises the intestine, and sensing transformed radiation emitted from the sensing area with a sensor, wherein the sensor is configured downstream of the intestine relative to a propagation of the radiation, and (ii) determining the connection location based on a distribution of the radiation sensed by the sensor over the sensing area.

18. The method according to claim 15, wherein the preparation stage further comprises:
  providing the first intestine end being manually separated from the membrane to an intestine receiving location of a transfer system, and providing the at least part of the package remainder comprising the second intestine end to a package receiving location of the transfer system;
  wherein the arranging stage comprises:
  transferring the first intestine end from the intestine receiving location to the transporting element, and transferring the at least part of the package remainder from the package receiving location to the retaining location, whereby the at least part of the package remainder is provided to the retaining element.

* * * * *